Figure 1A:
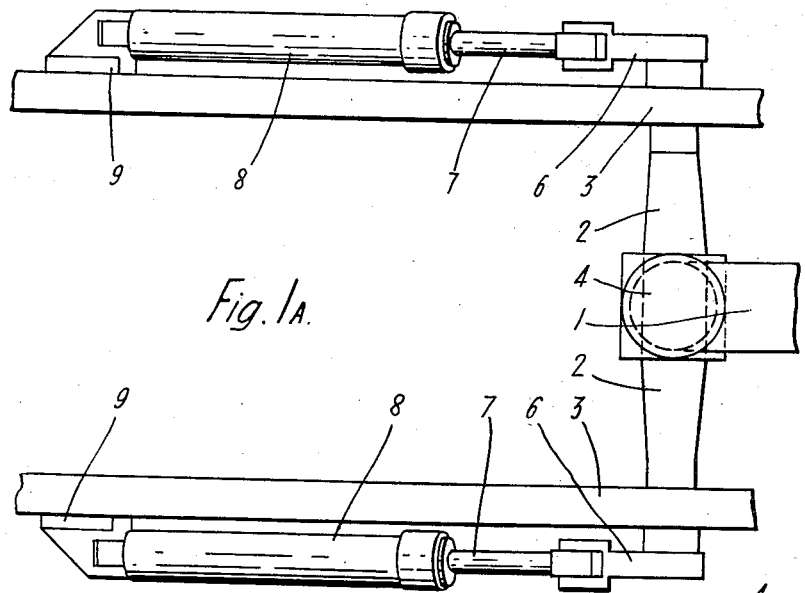

April 1, 1958 W. WHARTON 2,828,828
TRACTOR TRAILER WITH DRIVE TORQUE RESPONSIVE
TRACTION VARYING MEANS
Filed April 22, 1957 8 Sheets-Sheet 1
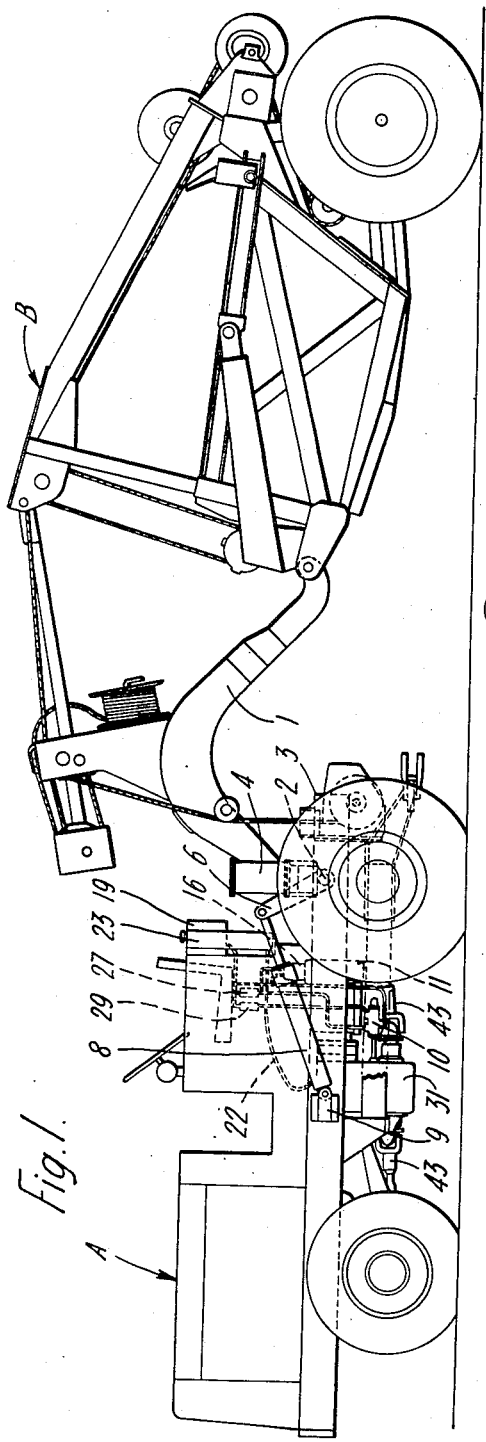
Inventor
William Wharton.
By
Attorney Inventor
William Wharton
By
A. Knights Broad
Attorney

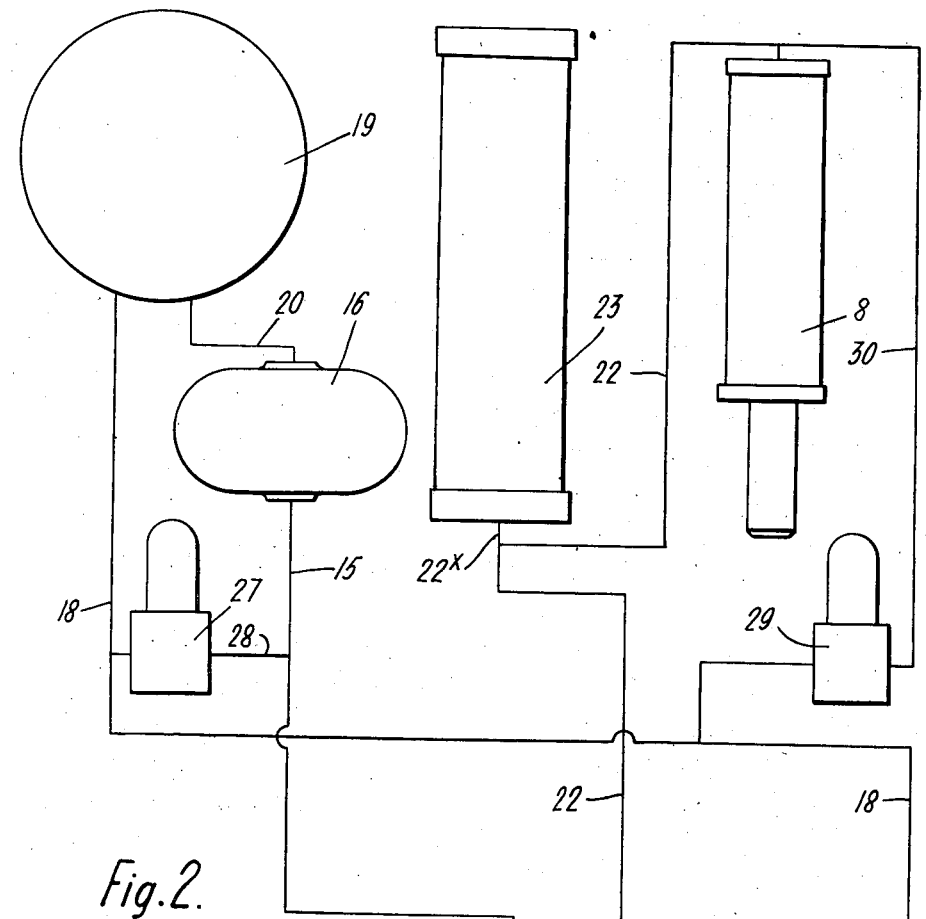
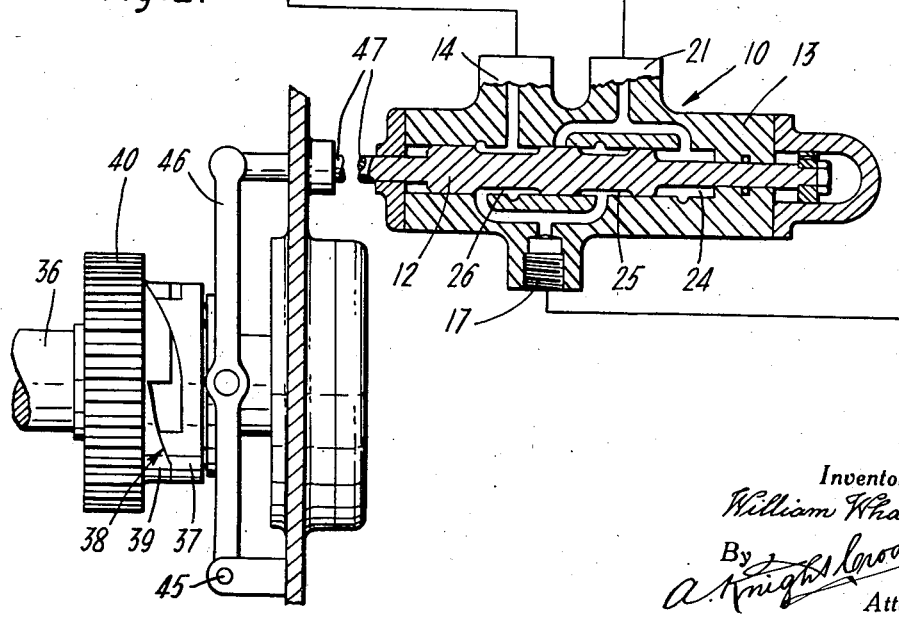
Fig. 2.

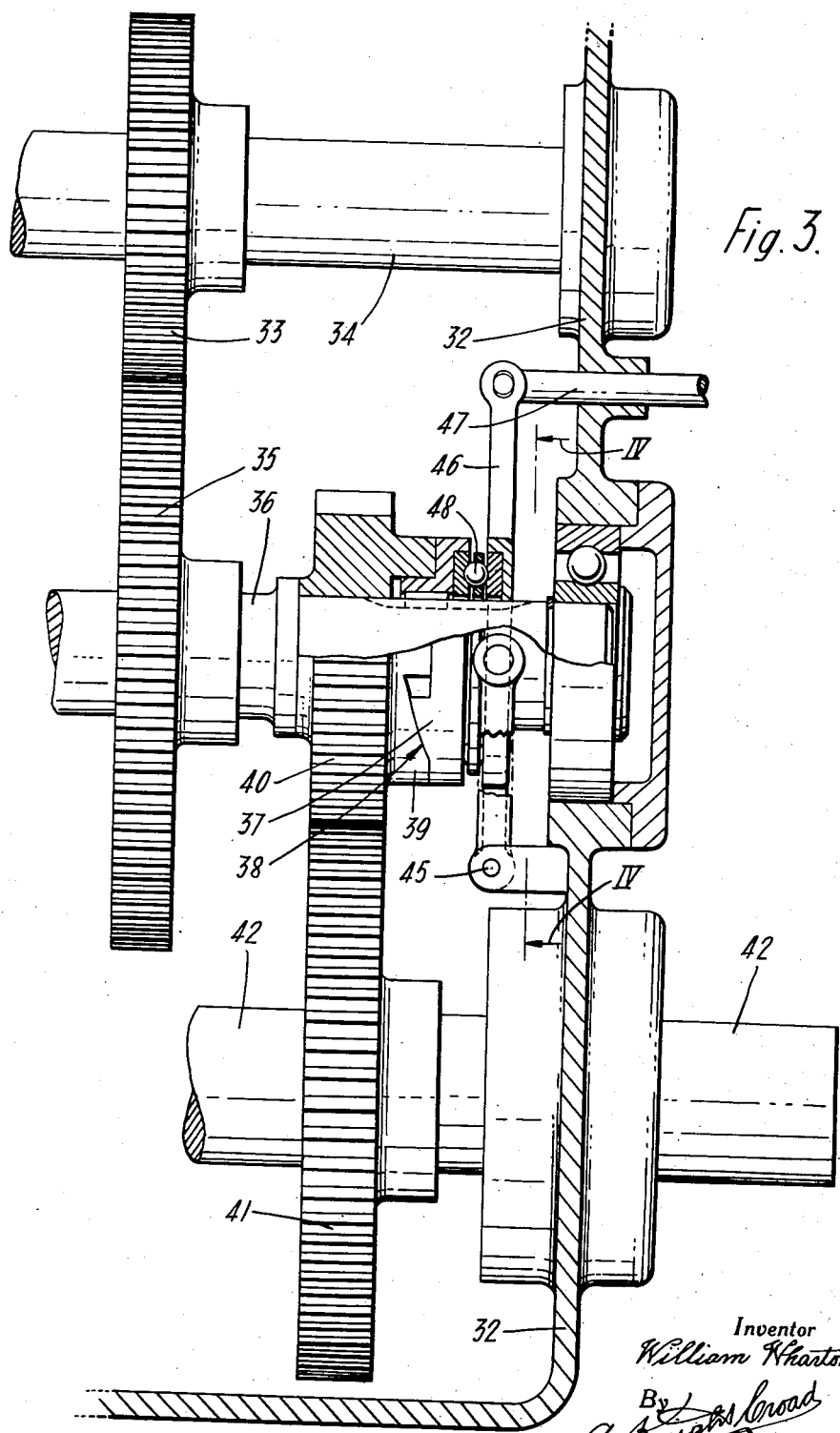

Inventor
William Wharton
By
Attorney

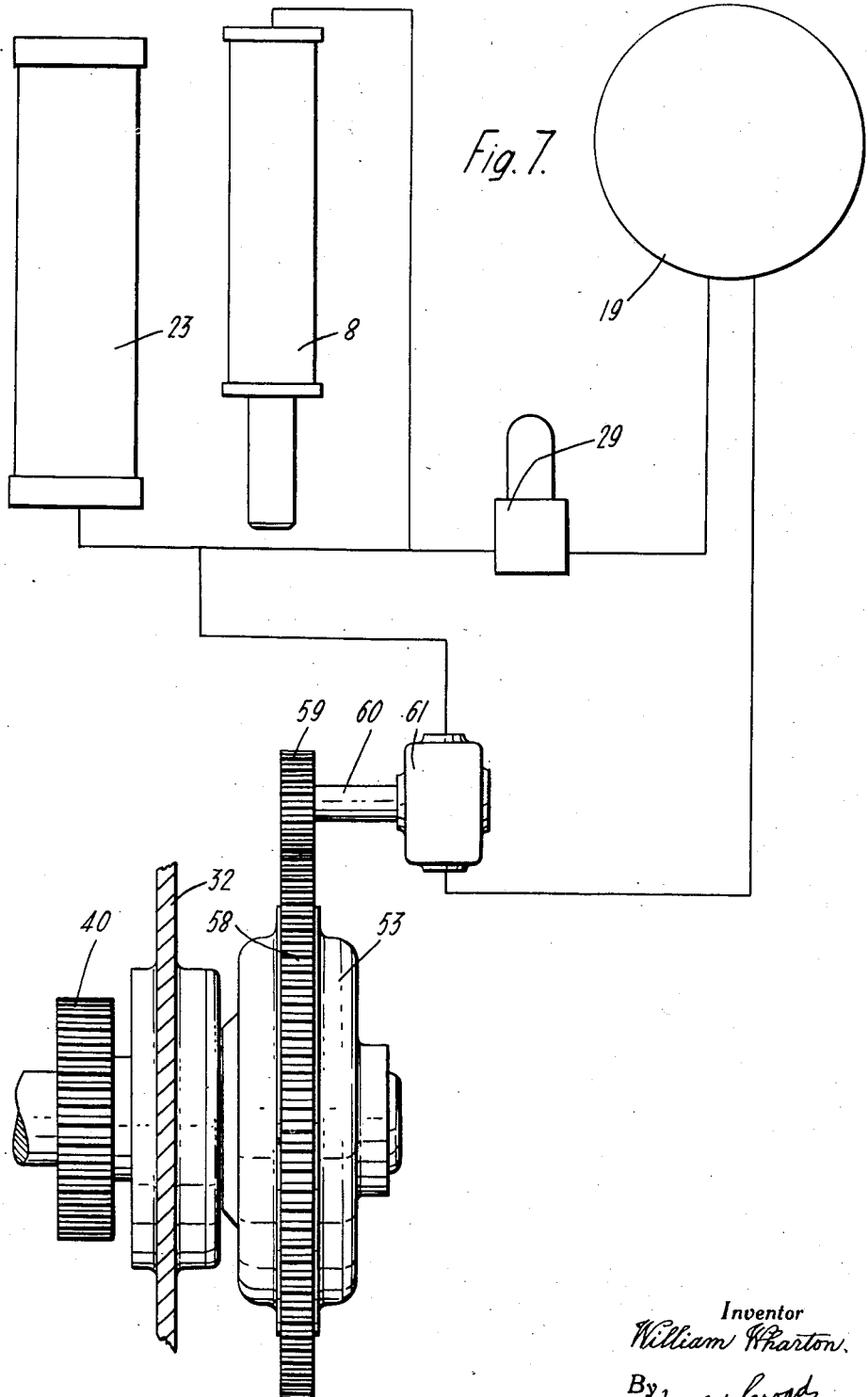

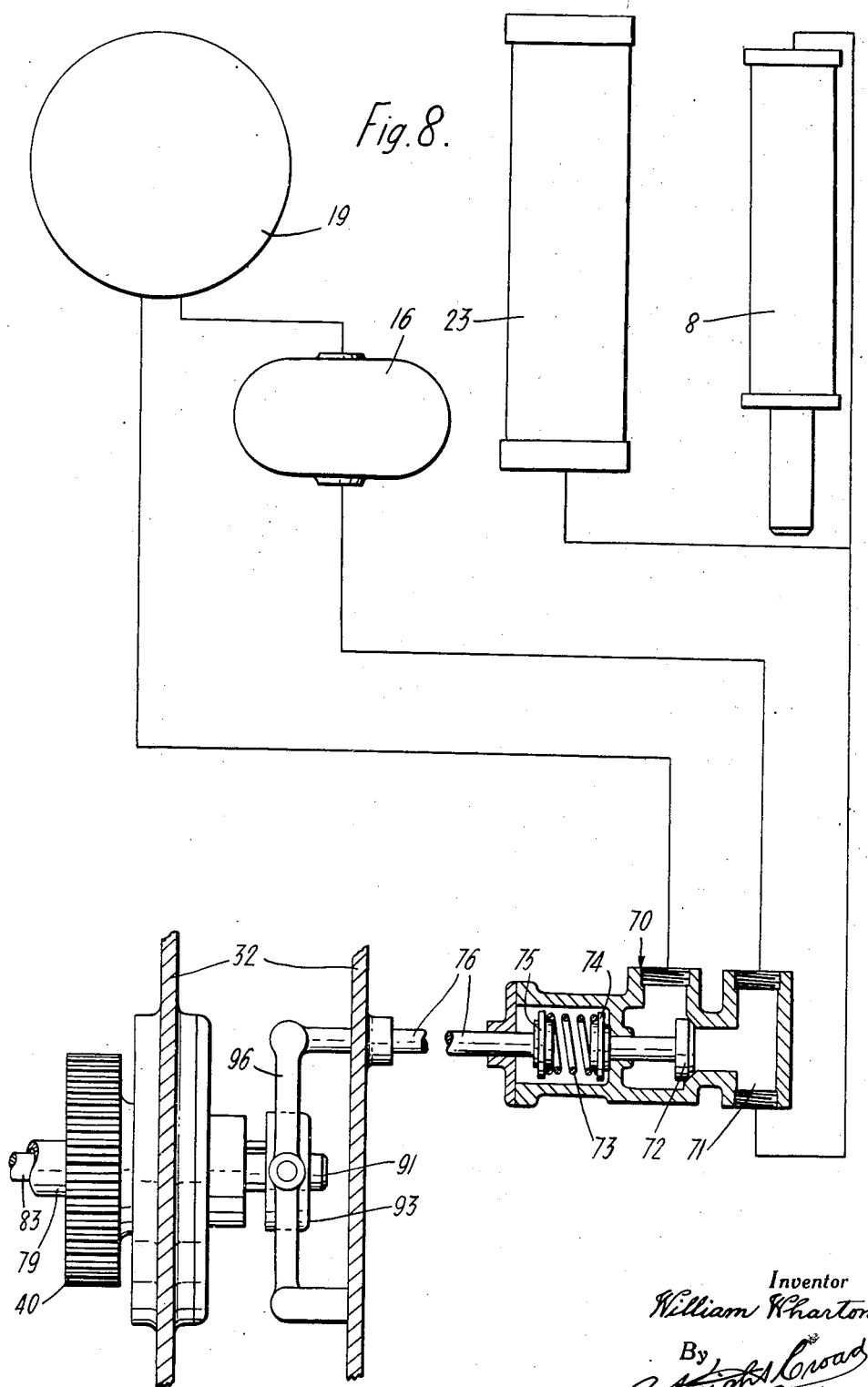

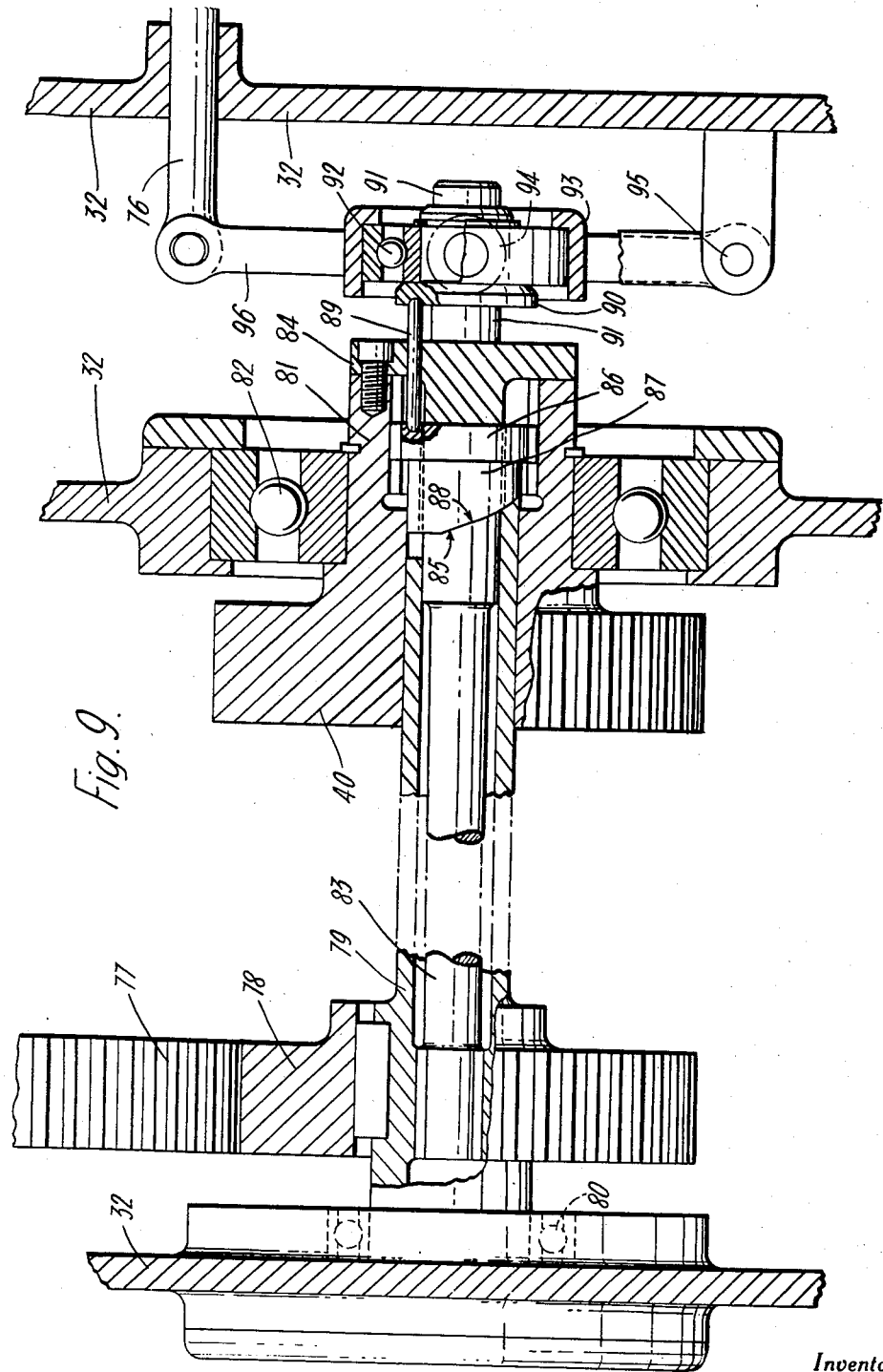

United States Patent Office 2,828,828
Patented Apr. 1, 1958

2,828,828

TRACTOR TRAILER WITH DRIVE TORQUE RESPONSIVE TRACTION VARYING MEANS

William Wharton, Hemel Hempstead, England

Application April 22, 1957, Serial No. 654,425

Claims priority, application Great Britain December 9, 1954

8 Claims. (Cl. 180—14)

This invention relates to tractor vehicles with trailers.

As explained in the specification to my co-pending application No. 540,089 dated October 12, 1955, now Patent No. 2,815,089 the reaction to the turning effort applied to the wheels of a tractor, with a trailer attached, tends to rotate the tractor bodily in a sense opposite to the direction of rotation of the wheels. Consequently there is a tendency, regardless of whether the front, back or both wheels of the tractor are driven, for the front wheels of the tractor to be lifted off the ground. The weight of the tractor ordinarily counteracts this reaction until it is balanced by it, but nevertheless the front wheels exert little or no pressure on the ground and therefore cannot be fully employed for driving or steering the tractor.

To overcome this disadvantage it is proposed in my aforesaid co-pending application to provide a tractor trailer combination having means for transferring the torque reaction of the tractor driving mechanism to the trailer whereby the pressure exerted on the ground by the front and rear wheels of the tractor may automatically be kept substantially constant, control of the transfer means being included in the draw bar or the like connection and being operable automatically or variations in the actual pull exerted at the draw bar or the like.

The present invention has for its object to provide alternative means for controlling the transfer means and has its origin in the fact that the torque reaction from the driving mechanism of a tractor is equal and opposite to the total turning effort applied to the wheels. It is therefore proportional to the torque applied by the engine and transmitted by each element of the driving mechanism.

According to this invention there is provided a tractor trailer combination having means for transferring the torque reaction of the tractor driving mechanism to the trailer whereby the pressure exerted on the ground by the front and rear wheels of the tractor may automatically be kept substantially constant, control of said transfer means being derived from variations in the torque transmitted to an element through which drive from the tractor engine to the tractor wheels is transmitted.

Features of this invention will become apparent from the following particular description of several ways of putting it into practice.

Figure 1B:
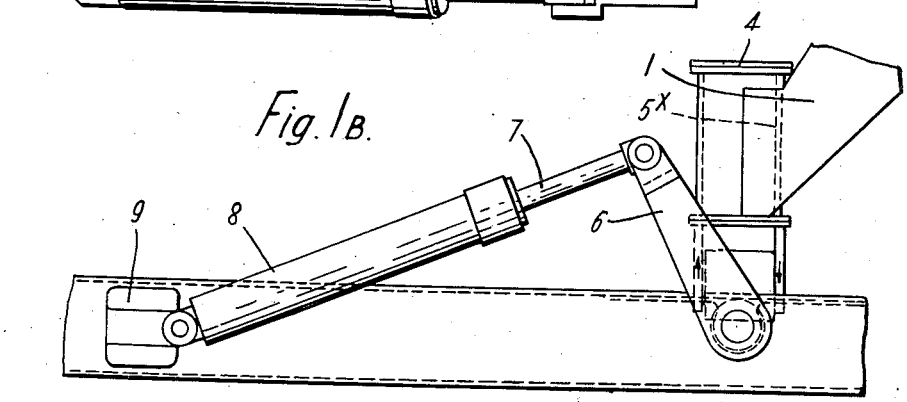
Figure 1C:
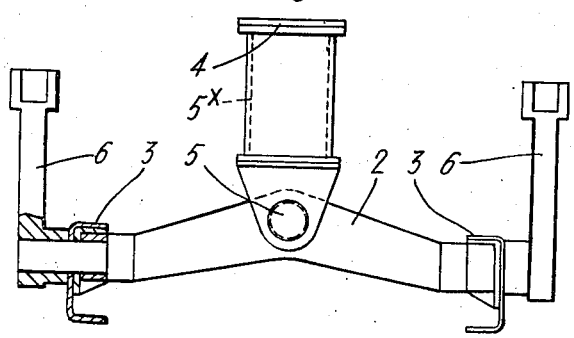
Figure 5:
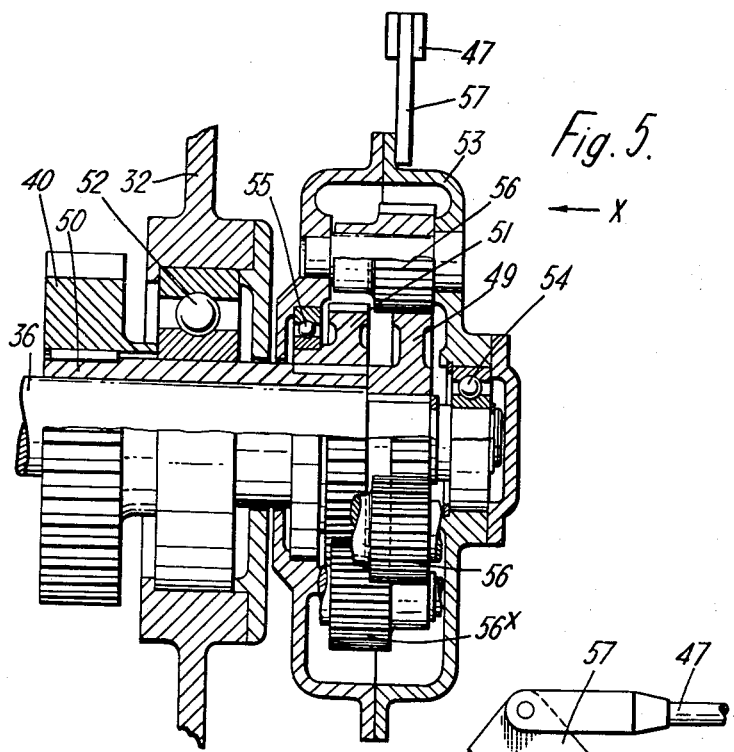
Figure 6:
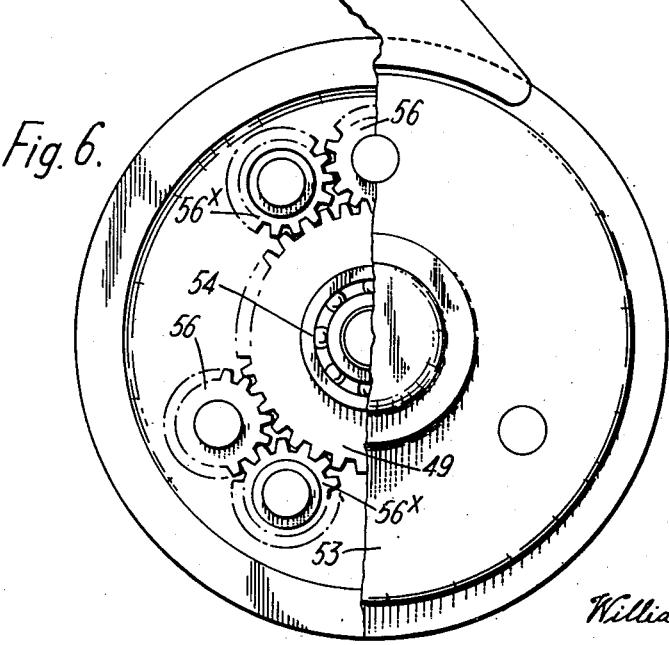

In the accompanying drawings, the scale of which is varied as required for a clear understanding of the several figures:

Figure 1 illustrates a tractor trailer combination to which the present invention has been applied, Figures 1A, 1B and 1C show details of the tractor trailer connection of the combination illustrated in Figure 1, Figure 1A being a plan view, Figure 1B a side elevation, and Figure 1C a rear elevation, Figure 2 is a diagrammatic lay-out of the parts of the transfer means provided in the tractor trailer combination illustrated in Figure 1, Figure 3 is a detail view, partly in section, showing the arrangement within the transfer gear box of the tractor trailer combination illustrated in Figure 1, Figure 4 is a fragmentary sectional view on the line IV—IV of Figure 3, Figure 5 is a detail view, partly in section, showing an alternative arrangement within the transfer gear box, Figure 6 is an end view of the parts shown in Figure 5, taken in the direction of the arrow X, Figure 7 shows diagrammatically an alternative lay-out of the parts of the transfer means and incorporating in the transfer gear box an arrangement similar to that shown in Figures 5 and 6, Figure 8 shows diagrammatically another layout of the parts of the transfer means with a further arrangement in the transfer gear box, and Figure 9 is a detail sectional view showing the arrangement within the transfer gear box in the layout shown in Figure 8.

Like reference numerals are used wherever possible for corresponding parts in the different arrangements described hereafter.

In Figure 1 there is shown a tractor A in combination with a two-wheel trailer vehicle B, the latter being connected to the tractor by a single draw bar member 1 disposed centrally of the rear axle of the tractor.

More specifically, as is clear from Figures 1A to 1C, a cross bar 2 is rotatably mounted in and extends between the side members 3 of the tractor chassis, the ends of the cross bar being of circular cross section but the central part thereof being of rectangular cross section and also upwardly bowed (see Figure 1C). The connector 4 for the draw bar member 1 is pivotally connected to the centre of the cross bar 2 by a horizontal pin 5 lying on the longitudinal axis of the tractor. The connector also includes a vertical pivot pin $5^x$ at right angles to the pin 5, the arrangement being such that the connector as a whole forms a universal coupling between the side members 3 and the draw bar member 1.

Rigidly mounted on each end of the cross bar 2 is an upstanding arm 6 to the upper end of which is pivotally connected a rod 7 carrying at its other end a ram which is disposed in a hydraulic cylinder 8. The two cylinders 8 are pivotally connected to brackets 9 secured to the side members 3 of the tractor chassis.

A control valve, indicated generally by the reference numeral 10, is mounted on the tractor chassis, this valve including a member 12 (see Figure 2) adapted for endwise sliding movement within the valve body 13 as will be hereinafter explained.

As is clearly shown in Figure 2 an inlet 14 of the control valve is connected by a pipe 15 to a pump 16, mounted on a transmission casing 11, and an outlet 17 is connected by a pipe 18 to a tank 19 for hydraulic fluid, the tank being connected by a pipe 20 to the pump. Another outlet 21 of the control valve is connected by a pipe 22 with the cylinders 8, a branch $22^x$ in the pipe 22 communicating with the fluid chamber of an accumulator 23 containing, for example, hydraulic fluid and compressed air separated by a piston or diaphragm. The outlet 21 is in permanent communication with the chamber 24 formed by a reduction in the diameter of one end of the member 12, in the periphery of which are also formed two spaced annular grooves 25 and 26.

It will be understood that this whole system is normally filled with hydraulic fluid, and that the parts thereof will be mounted in any suitable manner on the tractor.

During steady towing of the trailer by the tractor without variation in the torque transmitted by the driving mechanism the member 12 occupies the position shown in Figure 2. The pump 16, which is driven by any suitable means or from the engine of the tractor, operates continuously to pump hydraulic fluid passing to it from the tank 19 to the inlet 14 of the control valve, into the groove 26 in the member 12 and so to the outlet 17, into the pipe 18 and back to the tank 19. The fluid pressure in the accumulator 23 acting in the chamber 24 is balanced as is hereinafter explained and the member 12 remains stationary. The fluid pressure in the accumulator 23 also acts on the pistons of the rams in the cylinders 8 which counteracts the tendency of the tractor body to lift or rotate about the back axle thereof.

An increase in the torque transmitted by an element of the driving mechanism to the tractor wheels is utilised, as is hereinafter explained, to cause the member 12 to move rearwardly, or to the right as viewed in Figure 2; this isolates the inlet 14 from the outlet 17, but it puts it into communication through the groove 26 with the outlet 21 so that hydraulic fluid is then pumped along the pipes 22, 22$^x$ to the accumulator 23 and the ram cylinders 8, in all of which the pressure will thus be increased. This increases the force counteracting the tendency of the tractor body to lift or rotate about the back axle thereof.

When this increased force reaches a value appropriate to the increased torque applied to the wheels, pressure in the pipes 22, 22$^x$ causes fluid to flow back to the chamber 24 and the member 12 is moved to the left again to its initial position, thus putting the inlet 14 in communication with the outlet 17 again.

During the movements of the member 12 in either direction there is a moment when the inlet 14 is isolated from both outlets 17 and 21 and a relief valve 27 is provided in a pipe 28 communicating the pipe 15 with the pipe 18.

Occasions may arise causing a sudden movement of the rams in the cylinders 8 resulting in a momentary excessive increase in the pressure in the hydraulic system. A second relief valve 29 is arranged in a pipe 30 communicating the ram cylinders 8 with the pipe 18.

For the main movements of the rams which occur during normal towing of the trailer over undulating ground, the accumulator 23 acts as a spring or buffer.

A decrease in the torque transmitted by the driving mechanism will allow the pressure of the fluid in the accumulator 23 to cause movement of the member 12 further to the left. This puts the outlets 21 and 17 into communication through the groove 25. Fluid is let out of the accumulator 23, in which and in the ram cylinders 8 the pressure decreases. When this pressure is appropriate to the reduced driving torque the member 12 returns to its initial position.

One way of controlling movement of the member 12 will now be described with reference to Figures 2, 3 and 4, particularly Figure 3. Briefly, movement of the member 12 is controlled by the torque transmitted by one of the gears in the transmission 31 of the tractor.

The wall of the transmission is indicated by the reference numeral 32 and the shafts referred to below are suitably journalled in it. One gear 33 on a shaft 34 drives another gear 35 rigidly mounted on a shaft 36. The shaft 36 carries a member 37, which is keyed to the shaft so that it rotates with it but can also slide along it. The member 37 has three, or more, cam faces 38 which engage corresponding cam faces on a member 39 integrally formed with a gear 40 loosely mounted on the shaft 36. The gear 40 drives a further gear 41 mounted on a shaft 42 from which drive is taken off to the tractor wheels through Cardan shafts 43 (see Figure 1).

Thus when torque is transmitted from the shaft 36 through the cam faces 38 to the gear 40 the member 37 tends to move away from the member 39, that is to the right in Figure 3, and the force necessary to restrain this movement is proportional to the torque transmitted. Movement of the member 37 is restrained by a yoke 44 pivoted on a shaft 45 mounted in the gear box (see Figure 4), the shaft 45 carrying an arm 46 which at its upper end is connected to a rod 47 which in turn is connected to the end of the member 12 in the control valve. A ball race 48 is disposed between the member 37 and the yoke 44.

It follows therefore that a force will be applied to the member 12 which is proportional to the torque transmitted by the gear 35, and this force is balanced by the pressure in the accumulator 23 and ram cylinders 8.

In the alternative arrangement shown in Figures 5 and 6 the shaft 36 is rotated as before and has keyed to it at one end a gear wheel 49. The gear 40 is keyed to or formed integrally with a sleeve 50 which is loosely mounted on the shaft 36 and has keyed to its end adjacent the gear wheel 49 a second similar gear wheel 51. A bearing 52 is provided in the gear box wall 32 for the sleeve 50 which in turn carries the shaft 36. A casing 53 is rotatably mounted on bearings 54, 55 on the shaft 36 and sleeve 50 respectively, and this casing carries one or more, in this case three, equally spaced pairs of pinions 56, 56$^x$ (see Figure 6) the pinions of each pair being in mesh with each other and wheels 49, 51 respectively. The casing has an upstanding external bracket 57 which is pivotally connected to the rod 47, the latter being connected as before to the member 12.

When the shaft 36 is driven, it transmits drive to the gear 40 through the gear wheel 49, pinions 56 and 56$^x$, gear wheel 51 and sleeve 50. There will be a tendency for the casing 53 to rotate in the same sense as the shaft 36 and a force is thus imparted to the rod 47 which is proportional to the torque transmitted to the gear 40. This force is again balanced by the force in the accumulator 23 and ram pistons 8.

In the alternative lay-out shown in Figure 7 a rotatable casing 53, as described with reference to Figures 5 and 6, is employed. The bracket 57 is, however, omitted and the casing is provided with a peripheral gear ring 58 which engages a pinion 59 on the spindle 60 of a pump 61. The control valve 10 is dispensed with, the pump 61 receiving fluid from the tank 19 and being adapted to pump it to the accumulator 23 and ram cylinders 8. A relief valve 29 is provided between the ram cylinders and the pump and the tank.

With this lay-out when the main clutch of the tractor is engaged, preparatory to starting off, the casing 53 will be caused to rotate as explained above. The pump 61 will be operated to pump fluid from the tank 19 into the accumulator 23 raising the pressure therein and in the ram cylinders 8. Resistance to operation of the pump and the turning of the casing 53 increases with the pressure in the accumulator and when it is sufficient to overcome the resistance to movement of the tractor and trailer drive will be imparted through the gear 40 to the tractor wheels, the casing 53 then remaining stationary.

If the resistance to movement of the tractor and trailer decreases, the torque exerted by the pump on casing 53 becomes greater than the torque transmitted to the gear 40. The pump 61 then acts as a motor and rotates the casing in the opposite direction to that on starting up and the pressure in the accumulator 23 and the ram cylinders 8 decreases until it is appropriate to the reduced tractive effort, when the pump and casing will again be stationary.

In the further form of lay-out diagrammatically shown in Figure 8 the control valve 10 is again dispensed with; it is replaced by a different form of valve unit, indicated generally by the reference numeral 70. A pump 16 is continuously driven by the engine of the tractor or by any other suitable means, and pumps oil from the tank 19 through a passage 71 in the valve unit 70 into the accumulator 23 thus raising the pressure in it and in the ram cylinders 8 until the pressure is sufficient to open a by-pass valve member 72 in the valve unit against the action of a spring 73. This spring is located between a plate 74 on the stem of the valve member 72 and a plate 75 on the end of a rod 76 which passes slidably through the end of the valve unit remote from the passage 71. By moving the plate 75 towards the plate 74 the force exerted by the spring on the plate 74 and thus on the valve member 72 can be varied. Oil escaping past the valve member 72 passes back to the tank 19.

Movement of the rod 76 is controlled by, or, in other words, is made proportional to, the torque transmitted to the gear 40 in the transmission 31, the arrangement within the latter being clearly shown in Figure 9.

A gear 77 in the gear box drives a gear 78 rigidly mounted on or formed integrally with a sleeve 79 journalled at one end in a bearing 80 on the wall 32 of the gear box, and rotatably supported at the other end in the gear 40 which in turn is formed integrally with a sleeve 81 supported in a bearing 82 in the wall 32. A torsion shaft 83 is fixed at one end within the sleeve 79, that is at the end thereof supported in the bearing 80. At its other end the shaft 83 is secured to a cap 84 which is secured to the end of the sleeve 81 remote from the gear 40. Drive is thus transmitted from the sleeve 79 to the gear 40 through the torsion shaft 83 which will be twisted with respect to the sleeve 79 by an amount proportional to the torque transmitted. The amount of twist is used to control movement of the rod 76 as follows.

On the end of the sleeve 79 remote from the bearing 80 is one or more helicoidal surfaces 85. An annular member 86 is disposed around the end of the shaft 83 adjacent the cap 84, this member being splined in the sleeve 81 and having a projecting member 87 on which is also provided a helicoidal surface 88 adapted to engage the helicoidal surface 85. When the torsion shaft 83 is twisted with respect to the sleeve 79 the engaging helicoidal surfaces 85, 88 cause longitudinal movement of the annular member 86. Rods 89 slidably mounted in holes in the cap 84 transmit movement of the member 86 to a collar 90 slidably mounted on an extension 91 of the cap 84 and rotating with it. The collar 90 runs in a thrust bearing 92 in a housing 93 supported in a yoke 94 pivoted on a shaft 95 mounted in the gear box. The shaft 95 carries a crank 96 to which the rod 76 is attached.

Movement of the rod 76 is thus proportional to the torque transmitted to the gear 40; in other words the compression of the spring 73 is varied in accordance with the torque transmitted whereby pressure within the hydraulic system (pump, accumulator and ram cylinders) is also varied.

When the transmitted torque decreases, the by-pass valve 72 will open further and in addition to by-passing the pump output will allow fluid to escape from the accumulator and return to the tank, thus reducing the pressure in the accumulator and the ram cylinders.

Reference has been made above only to a tractor in combination with a two-wheel trailer vehicle. It will be understood however that any of the above described ways of putting the invention into practice can equally well be applied to a tractor in combination with a four-wheel vehicle, such as is also described in the specification to our aforementioned co-pending application No. 540,089. The invention may also be used in connection with tracked vehicles, and tractor vehicles having more than four wheels.

In each of the arrangements described above it is the torque transmitted by a gear in the transfer gear box but it will be understood that it may equally well be any element of the transmission between the engine and the Cardan shafts to the tractor wheels or the like.

I claim:

1. A tractor trailer combination with interposed draw bar connecting means, said combination including means on the tractor for transmitting drive to the wheels thereof, and means for exerting a controlled downward thrust on the tractor from the trailer and thus counteracting the tendency of the tractor, whilst towing the trailer, to rotate bodily about its back axle, said pressure exerting means comprising a hydraulic system provided on the tractor and including at least one hydraulic cylinder and piston unit connected at one end with respect to the tractor and at the other end with respect to the trailer and adapted on the extension thereof to cause a downward thrust to be exerted on the tractor with respect to the trailer, means for controlling the pressure of the fluid in said hydraulic cylinder, and an element having an operative connection with a member of said drive transmitting means and subject to variations in the torque therein, which element is connected to said control means for operating same so as automatically to vary the pressure of the fluid in the hydraulic system in direct proportion to the said torque.

2. A tractor trailer combination with interposed draw bar connecting means, said combination including means on the tractor for transmitting drive to the wheels thereof, and means for exerting a controlled downward thrust on the tractor from the trailer and thus counteracting the tendency of the tractor, whilst towing the trailer, to rotate bodily about its back axle, said pressure exerting means comprising a closed piping circuit mounted on the tractor and filled with hydraulic fluid, means for continuously pumping fluid to and through said circuit, a hydraulic cylinder and piston unit connected at one end with respect to the tractor and at the other end with respect to the trailer and adapted on the extension thereof to cause a downward thrust to be exerted on the tractor from the trailer, further pipe means for communicating the interior of said cylinder with said closed circuit, said pipe means and cylinder also being filled with hydraulic fluid, a valve for putting said pipe means in communication with and cutting same off from said closed circuit, said valve having a control element adapted for movement to allow flow of hydraulic fluid through said closed circuit and to and from said pipe means, and a member provided in said drive transmitting means and through which drive is transmitted to the wheels of the tractor, said member being adapted for movement under the influence of torque transmitted to it and being operatively connected to said valve control element so as to impart thereto movements proportional to said torque, the arrangement being such that the pressure of the hydraulic fluid in said cylinder increases with the torque whereby the required downward thrust is exerted on the tractor from the trailer.

3. A tractor trailer combination with interposed draw bar connecting means, said combination including means on the tractor for transmitting drive to the wheels thereof, a gear box forming part of said drive transmitting means, and means for exerting a controlled downward thrust on the tractor from the trailer and thus counteracting the tendency of the tractor, whilst towing the trailer, to rotate bodily about its back axle, said pressure exerting means comprising a closed piping circuit mounted on the tractor and filled with hydraulic fluid, means for continuously pumping fluid to and through said circuit, a hydraulic cylinder and piston unit connected at one end with respect to the tractor and at the other end with respect to the trailer and adapted on the extension thereof to cause a downward thrust to be exerted on the tractor from the trailer, further pipe means for communicating the interior of said cylinder with said closed circuit, said pipe means and cylinder also being filled with hydraulic fluid, a valve for putting said pipe means in communication with and cutting same off from said closed circuit, said valve having a control element adapted for movement to allow flow of hydraulic fluid through said closed circuit and to and from said pipe means, and a gear member provided in said gear box and through which drive is transmitted to the wheels of the tractor, said gear member being adapted for movement under the influence of torque transmitted to it and being operatively connected to said valve control element so as to be adapted to impart thereto movements proportional to said torque, the arrangement being such that the pressure of the hydraulic fluid in said cylinder increases with the torque whereby the required downward thrust is exerted on the tractor from the trailer.

4. A tractor trailer combination as claimed in claim 3 comprising an element for transmitting drive to said gear member, which element has with the gear member mutually engaging cam faces whereby said element tends to move away from the gear member, and a yoke operatively connected to said element and to said valve control element whereby movement of said element is subject to fluid pressure acting on said valve control element.

5. A tractor trailer combination with interposed draw bar connecting means, said combination including means on the tractor for transmitting drive to the wheels thereof, a gear box forming part of said drive transmitting means, and means for exerting a controlled downward thrust on the tractor from the trailer and thus counteracting the tendency of the tractor, whilst towing the trailer, to rotate bodily about its back axle, said pressure exerting means comprising a closed piping circuit mounted on the tractor and filled with hydraulic fluid, means for continuously pumping fluid to and through said circuit, a hydraulic cylinder and piston unit connected at one end with respect to the tractor and at the other end with respect to the trailer and adapted on the extension thereof to cause a downward thrust to be exerted on the tractor from the trailer, further pipe means for communicating the interior of said cylinder with said closed circuit, said pipe means and cylinder also being filled with hydraulic fluid, a valve for putting said pipe means in communication with and cutting same off from said closed circuit, said valve having a control element adapted for movement to allow flow of hydraulic fluid through said closed circuit and to and from said pipe means, a gear member provided in said gear box and through which drive is transmitted to the wheels of the tractor, a casing containing said gear member and having a connection therewith whereby it tends to rotate bodily with the gear member due to the torque transmitted thereto, said casing being operatively connected to said valve control element whereby the tendency of the casing to rotate is opposed to the fluid pressure acting on said valve control element, the arrangement being such that the pressure of fluid in the hydraulic cylinder increases with the torque transmitted to said gear member whereby the required downward thrust is exerted on the tractor from the trailer.

6. A tractor trailer combination with interposed draw bar connecting means, said combination including means on the tractor for transmitting drive to the wheels thereof, and means for exerting a controlled downward thrust on the tractor from the trailer and thus counteracting the tendency of the tractor, whilst towing the trailer, to rotate bodily about its back axle, said pressure exerting means comprising a closed hydraulic piping system mounted on the tractor, means for continuously pumping fluid through said system, a valve included in said system, means for resiliently urging said valve into its closed position, said valve being adapted to open automatically under the pressure of fluid in the system thus allowing the fluid to circulate, means connected to said valve and also to an element of said drive transmitting means and adapted to increase the closing force of the valve in direct proportion to the torque transmitted to said element, a hydraulic cylinder and piston unit connected at one end with respect to the tractor and at the other end with respect to the trailer and adapted on the extension thereof to cause a downward thrust to be exerted on the tractor with respect to the trailer, and further piping means communicating said cylinder with said closed piping system between said valve and said pumping means, whereby fluid pressure in the said circuit and cylinder is variable automatically in direct proportion to the said torque.

7. A tractor trailer combination with interposed draw bar connecting means, said combination including means on the tractor for transmitting drive to the wheels thereof, a gear box included in said drive transmitting means, and means for exerting a controlled downward thrust on the tractor from the trailer and thus counteracting the tendency of the tractor, whilst towing the trailer, to rotate bodily about its back axle, said pressure exerting means and control therefor comprising a closed hydraulic piping system mounted on the tractor, a pump for continuously circulating fluid through said system, a valve included in said system, a compression spring for urging said valve towards and into its closed position, said valve being adapted to open automatically under the pressure of fluid in the system thus allowing the fluid to circulate, a first gear member in said gear box through which drive is transmitted to the wheels of the tractor, a torsional shaft secured coaxially at one end to said first gear member, a second gear member carried by the other end of the torsional shaft and through which drive is also transmitted to the wheels of the tractor, the arrangement being such that the torsional shaft is transmitting drive from the first to the second gear member will become twisted according to the torque transmitted by the first gear member, a cam element movable longitudinally of said shaft by the twisting thereof, a linkage between said cam element and said compression spring adapted on movement of the cam element due to twisting of the shaft to increase the compression of the spring, whereby the closing force of the valve is variable in direct proportion to the torque transmitted by said first gear element, a hydraulic cylinder and piston unit connected at one end with respect to the tractor and at the other end with respect to the trailer and adapted on the extension thereof to cause a downward thrust to be exerted on the tractor with respect to the trailer, and further piping means communicating said cylinder with said closed piping system between said valve and said pumping means, whereby fluid pressure in the said circuit and cylinder is variable automatically in direct proportion to the said torque.

8. A tractor trailer combination with interposed draw bar connecting means, said combination including means on the tractor for transmitting drive to the wheels thereof, and means for exerting a downward thrust on the tractor from the trailer and thus counteracting the tendency of the tractor, whilst towing the trailer, to rotate bodily about its back axle; said pressure exerting means comprising a hydraulic fluid system which includes a hydraulic cylinder and piston unit connected at one end with respect to the tractor and at the other end with respect to the trailer and adapted on the extension thereof to cause a downward thrust to be exerted on the tractor with respect to the trailer, and a motor adapted to pump fluid to and through said system to increase the pressure therein including in said cylinder, and means having an operative connection with a member of said drive transmitting means for controlling said motor, which means is subject to the torque transmitted to said member whereby fluid pressure in said system and in said cylinder is variable in direct proportion to the said torque.

No references cited.